US006516128B2

(12) United States Patent
Hwang

(10) Patent No.: US 6,516,128 B2
(45) Date of Patent: Feb. 4, 2003

(54) OPTICAL FIBER DISTRIBUTION PANEL ASSEMBLY

(75) Inventor: Liang Hwang, Old Bridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 30 days.

(21) Appl. No.: 09/845,408

(22) Filed: Apr. 30, 2001

(65) Prior Publication Data

US 2002/0159743 A1 Oct. 31, 2002

(51) Int. Cl.[7] .................................................. G02B 6/00

(52) U.S. Cl. ....................... 385/134; 385/135; 385/136; 385/137

(58) Field of Search .......................... 385/17, 134, 135, 385/136, 137

(56) References Cited

U.S. PATENT DOCUMENTS 5,461,693 A * 10/1995 Pimpinella .................. 385/135
6,201,919 B1 * 3/2001 Puetz et al. ................. 385/134
6,278,829 B1 * 8/2001 BuAbbud et al. ........... 385/135

* cited by examiner

*Primary Examiner*—Robert H. Kim
*Assistant Examiner*—Therese Barber

(57) ABSTRACT

An optical fiber distribution panel assembly wherein a panel holding fiber connector blocks is pivotably mounted to a base member about a horizontal axis. Fibers exiting an optical switching module supported on the base member are routed up the sides of the panel and terminatd at appropriate ones of the fiber connector blocks. Excess slack fiber is coiled and placed on fiber takeup saddles secured to a panel overlying the connector block field. A cover panel overlies the saddle-holding panel to complete the assembly.

7 Claims, 6 Drawing Sheets

12 16 20 26 28 30 31 24 32 36 38 40 42 44 34 46 14

12
16
20
26
20
31
24
31
46
14
30
32
32
28
32
32
36
38
40
34
36
38
42
44
44

OPTICAL FIBER DISTRIBUTION PANEL ASSEMBLY

BACKGROUND OF THE INVENTION

This invention relates to the routing of optical fibers and, more particularly, to an improved optical fiber distribution panel assembly.

Modern high speed telecommunications equipment increasingly relies on the use of optical fibers as a transmission medium, since it provides the bandwidth needed by customers. However, the optical fibers must be handled with care to prevent optical losses. When an optical fiber is bent, micro-cracking may occur and damage the expensive and fragile fiber. It is therefore important to control the bend radius of the fiber. As a general rule, fiber handling and packaging is much more restrictive than wire handling and packaging.

As customers demand higher bandwidth, communications service providers are interested in purchasing the most compact system that takes up the least amount of floor space. Accordingly, increasingly higher fiber counts are packaged into a limited space. To complicate matters, optical fiber organization always involves slack management for two reasons:

1. Fiber termination can yield length variation that is dictated by its manufacturing tolerances; and
2. It is desirable to have equal length fiber cables used for multiple equipment module locations.

In a particular optical cross connect system, it is needed to package 256 input and 256 output fibers in an extremely limited space. These fibers exit an optical switching module and must be distributed onto a fiber patch panel. An innovative solution is needed to manage the fiber slack and bend radius as discussed above. In addition, there must be a way to access the inside of the panel to be able to debug and replace internal components as needed. Further, the intrinsic segregation of the input and output fibers as they exit the optical switching module does not lend itself to easy field installation. The field installation would be eased with an interleaving of input and output fibers so that the input/output fibers from a particular pack can be in one group and in close proximity on the panel for easy access. It would therefore be desirable to have an optical fiber distribution panel which satisfies all of the aforedescribed needs.

SUMMARY OF THE INVENTION

According to the present invention, there is provided an optical fiber distribution panel assembly comprising a base member and a first panel hingedly secured to the base member about a horizontal axis. The first panel has a pair of lateral edges extending upwardly from the horizontal axis and is formed with a plurality of apertures each adapted to receive a respective fiber connector block. Each of a pair of fiber channels is mounted to a respective one of the lateral edges of the first panel. A second panel is secured to the pair of fiber channels and a plurality of fiber takeup saddles are mounted to the second panel.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
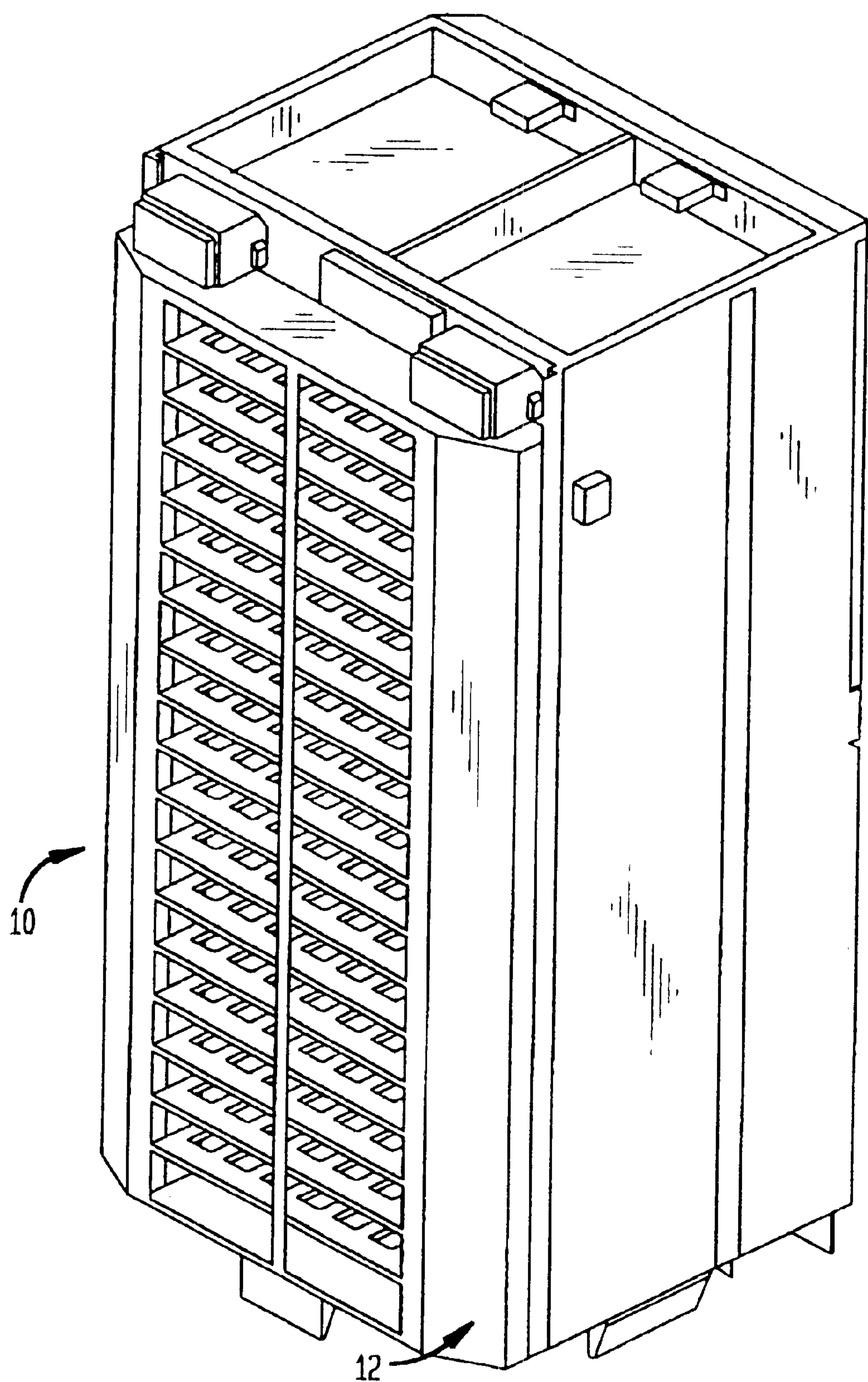
FIG. 1 is a perspective view of an optical fiber distribution frame incorporating a panel assembly according to the present invention.
Figure 2:
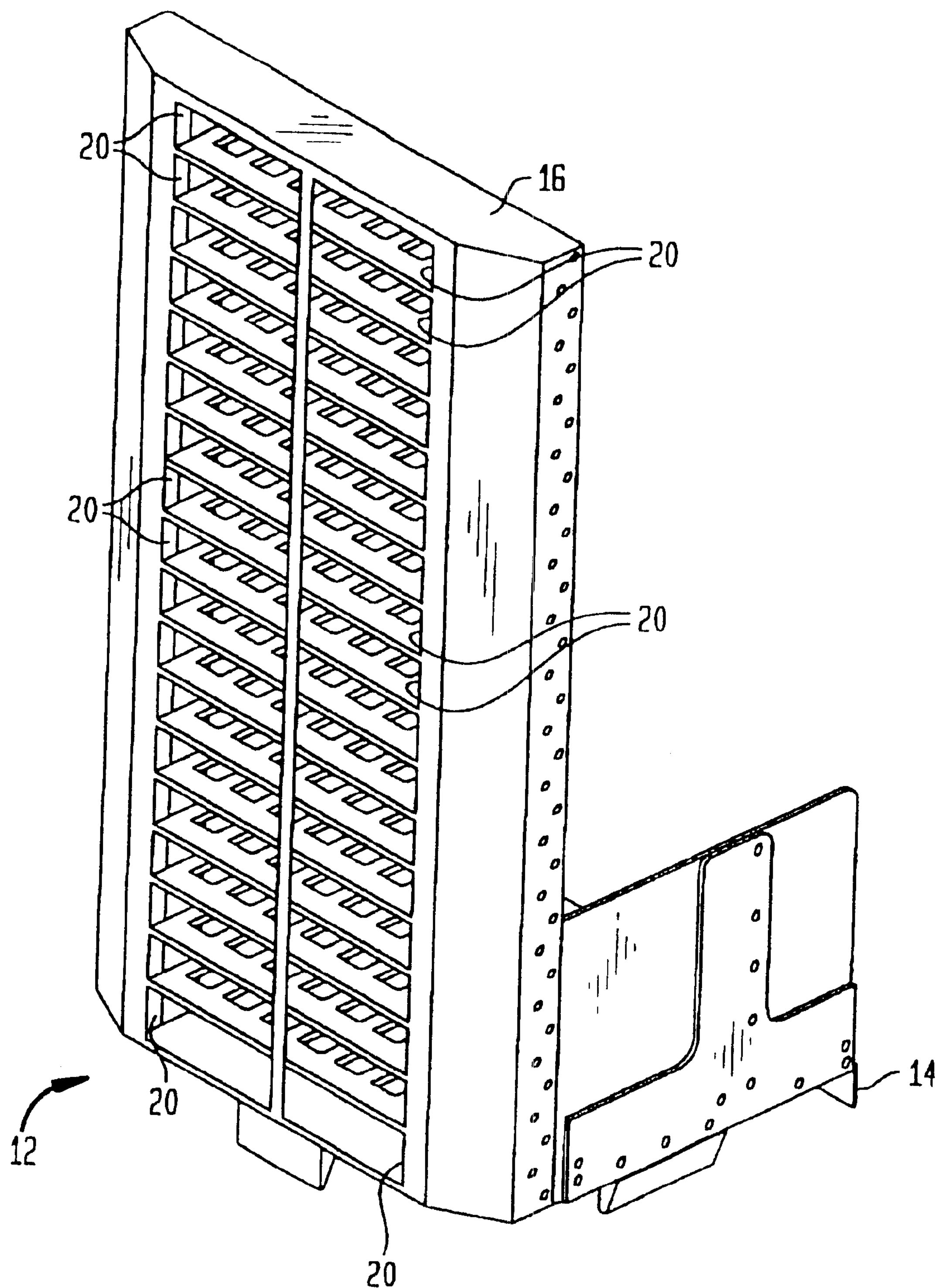
FIG. 2 is a perspective view of an optical fiber distribution panel assembly according to the present invention.
Figure 3:
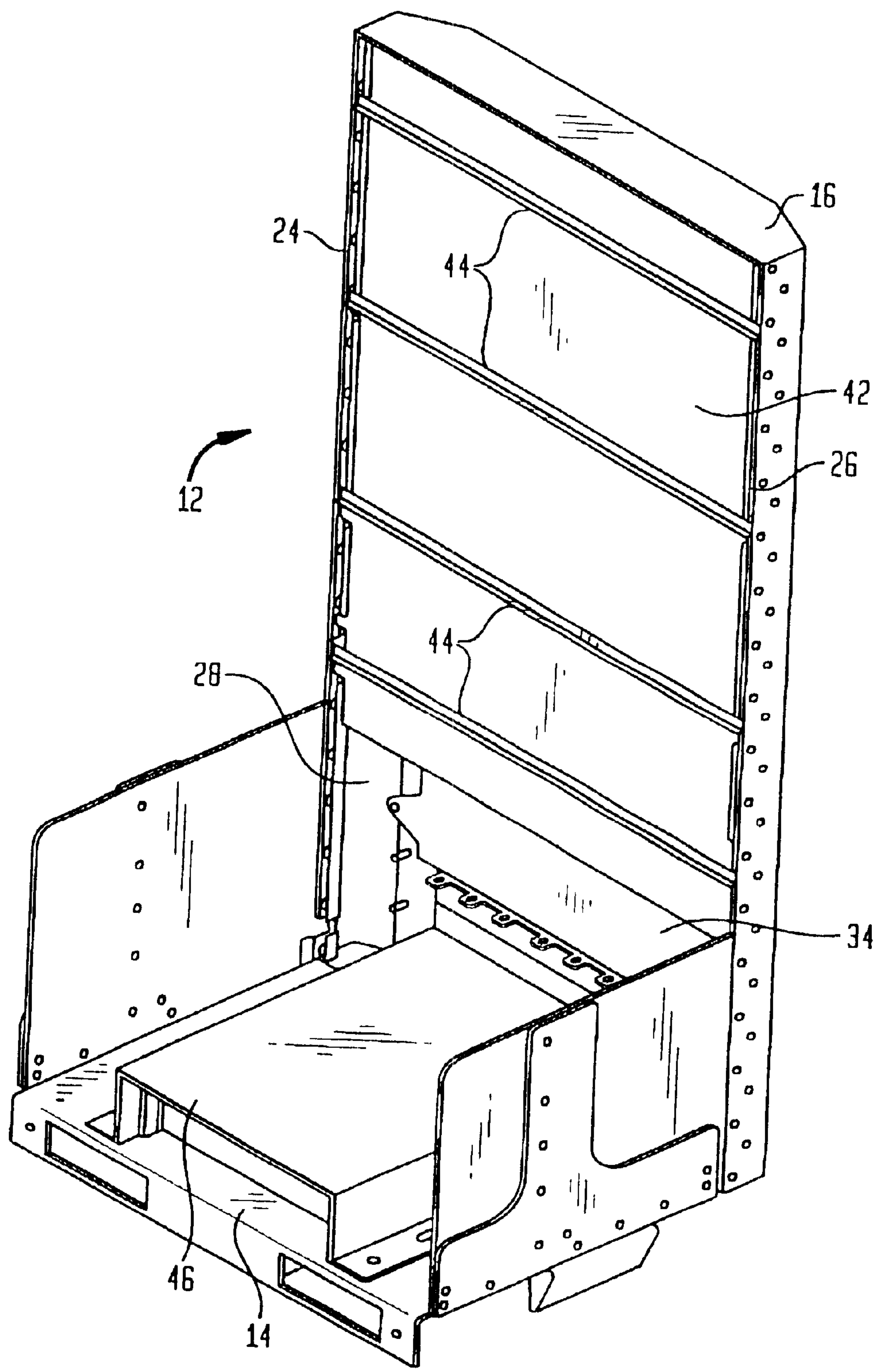
FIG. 3 is a top perspective view of the interior of the assembly shown in FIG. 2.
Figure 4:
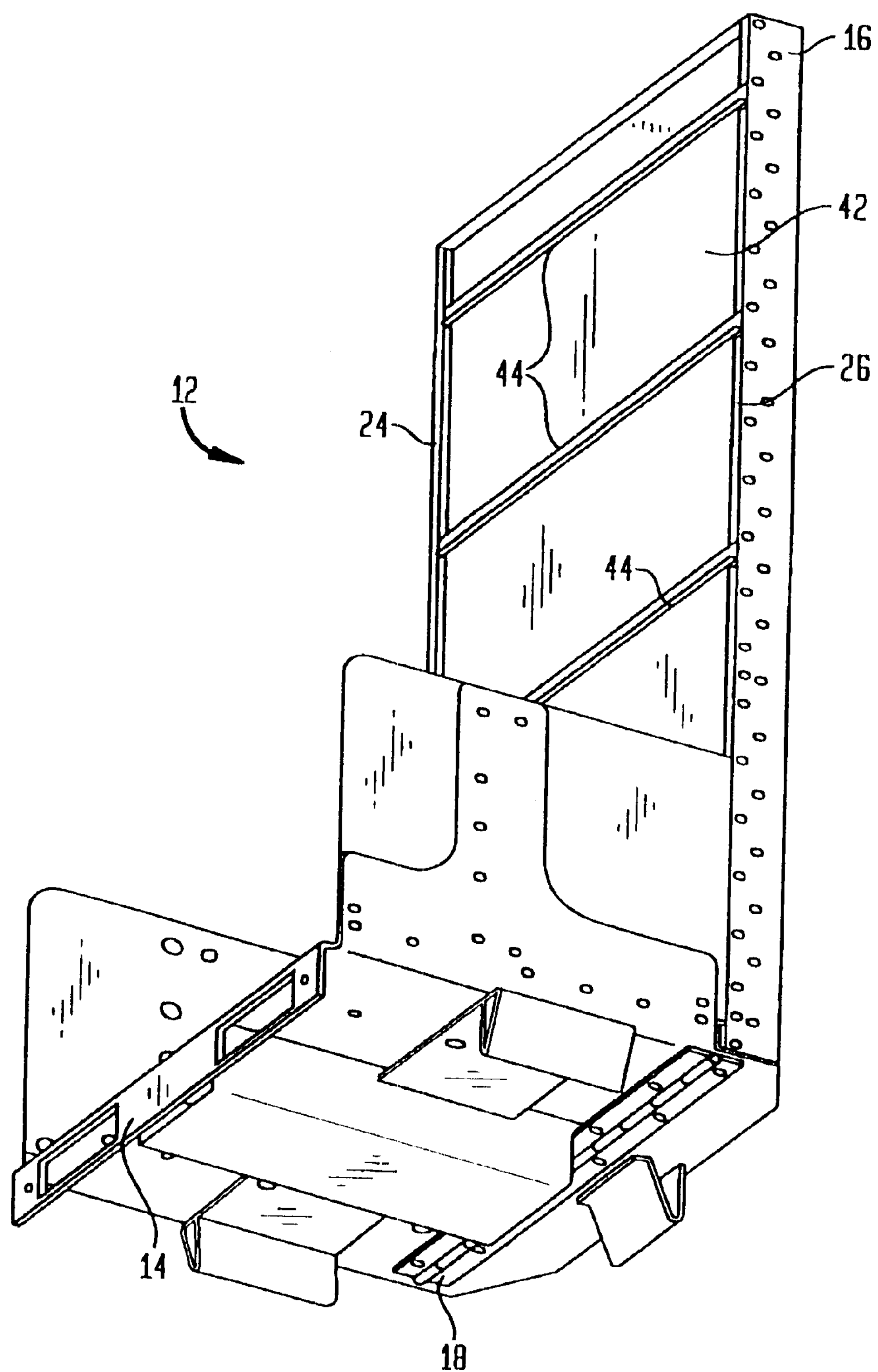
FIG. 4 is a bottom perspective view of the assembly shown in FIG. 2.
Figure 5:
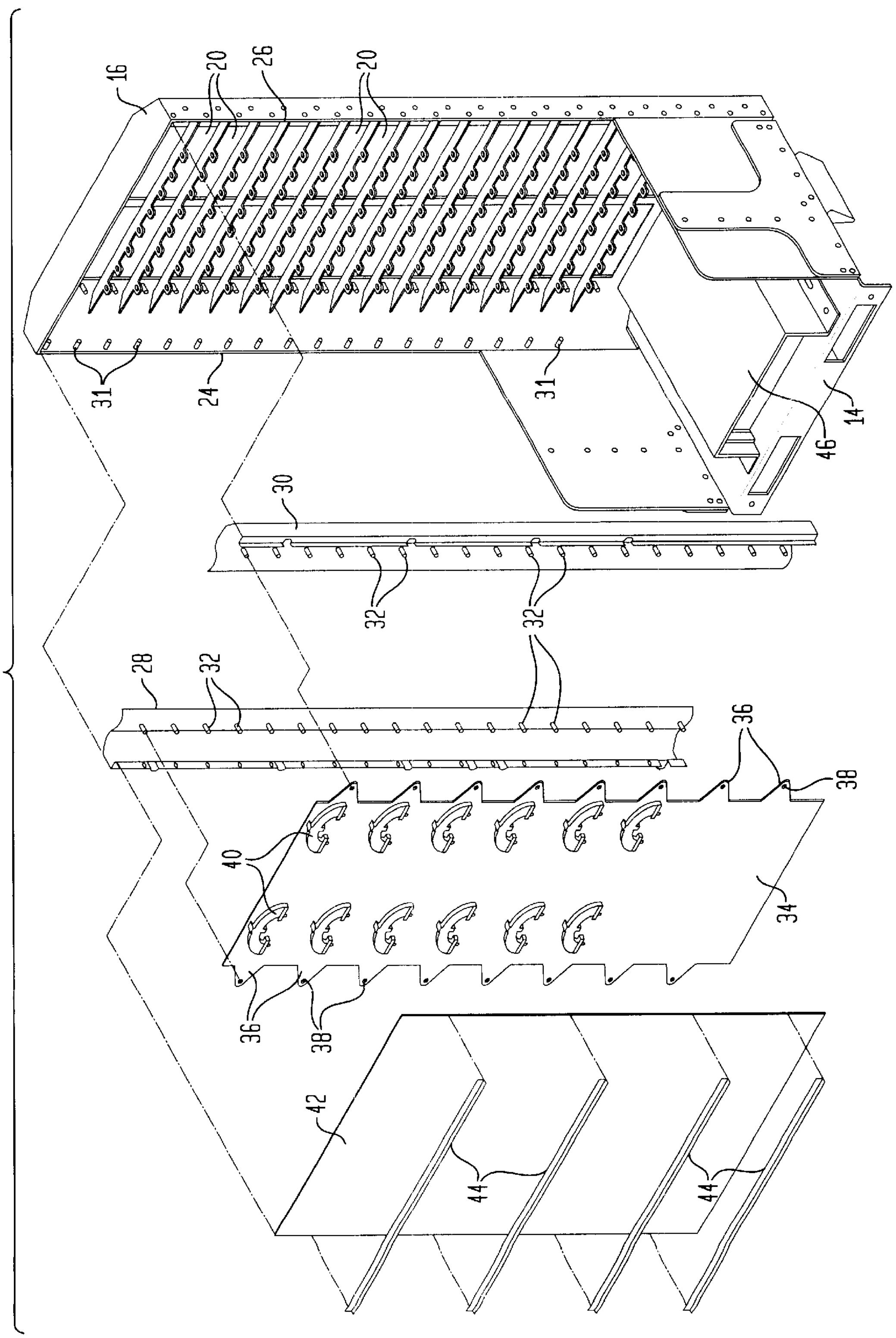
FIG. 5 is an exploded perspective view of the assembly shown in FIG. 2.
Figure 6:
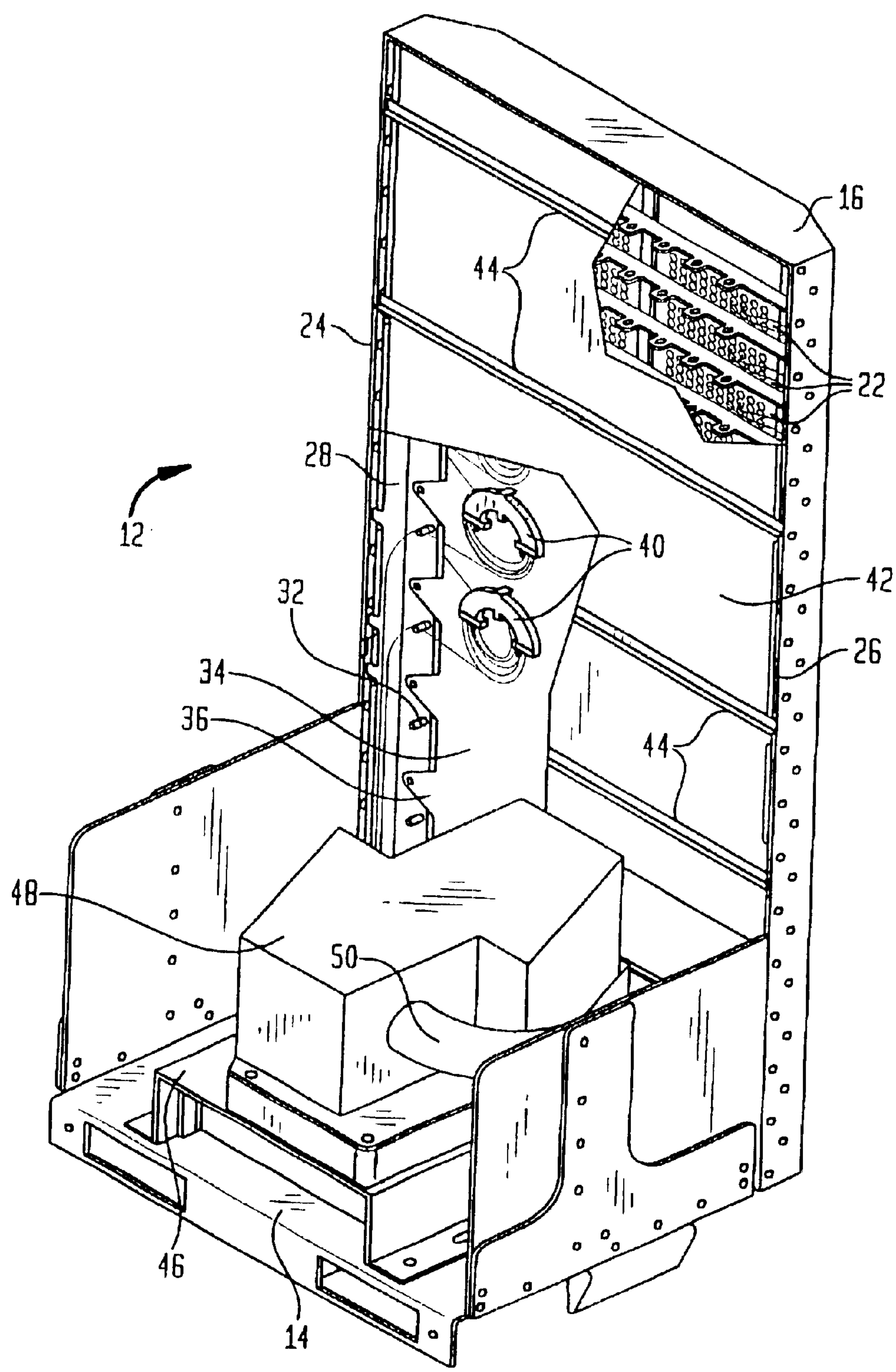
FIG. 6 is a partially cut away perspective view of the panel assembly shown in FIG. 2 illustrating the routing of optical fibers therein.

Referring now to the drawings, FIG. 1 shows an optical fiber distribution frame, designated generally by the reference numeral 10, which incorporates an optical fiber distribution panel assembly, designated generally by the reference numeral 12, constructed according to the present invention. As shown in FIGS. 2–6, the panel assembly 12 includes a base member 14 and a first panel 16. A hinge 18 (FIG. 4) secures the first panel 16 to the base member 14 for relative pivoting movement about a horizontal axis. The first panel 16 is formed with a plurality of apertures 20 each adapted to receive a respective fiber connector block 22 (FIG. 6).

The first panel 16 has a pair of lateral edges 24, 26 which extend upwardly from the horizontal axis defined by the hinge 18. Adjacent each of the lateral edges 24, 26 is a respective vertically spaced array of externally threaded stubs 31 (FIG. 5). A pair of fiber channels 28, 30 are each mounted to a respective one of the lateral edges 24, 26, illustratively being secured by nuts (not shown) to the threaded stubs 31. Each of the fiber channels 28, 30 is an elongated sheet metal member formed into a longitudinally open substantially cylindrical shape, as can best be seen in FIG. 5. A plurality of standoffs 32 are secured to the fiber channels 28, 30 in a spaced vertical array inward of the respective lateral edge 24, 26. As will be described in full detail hereinafter, the standoffs 32 are internally threaded and function both as fiber guides and as mounting posts for another element of the assembly 12.

The panel assembly 12 also includes a second panel 34. The second panel 34 is a substantially rectangular piece of sheet metal having a plurality of vertically spaced and laterally extending tabs 36. The tabs 36 are substantially triangular in shape and each has an opening 38 at its distal vertex. The tabs 36 are so spaced that alternate ones of the standoffs 32 are registrable with respective ones of the openings 38 so that screws (not shown) can be inserted through the openings 38 and threadedly engage the standoffs 32 to mount the second panel 34 to the fiber channels 28, 30. Mounted to the second panel 34 is a plurality of fiber takeup saddles 40, about each of which an optical fiber can be wrapped to maintain the minimum bend radius.

A cover panel 42 is secured to the outside edges of the fiber channels 28, 30 in overlying relation to the second panel 34 and the fiber takeup saddles 40, and a plurality of vertically spaced horizontal support bars 44 overlie the cover panel 42 and are also secured to the outside edges of the fiber channels 28, 30 to provide structural rigidity to the assembly 12.

A platform 46 is mounted to the base member 44 and an optical switching module 48 is mounted to the platform 46. From opposed sides of the module 48, input and output bundles of optical fibers extend, only one of which (i.e., the bundle 50) is shown. The aforedescribed panel assembly 12 functions to route the individual fibers within the bundles exiting the module 48 to appropriate ones of the fiber connector blocks 22, while at the same time managing the slack of the fibers to prevent damage thereto.

To perform the fiber distribution and routing, the first panel 16 is pivoted about the hinge 18 so that it is substantially horizontal. At this point, the fiber connector blocks are installed in the apertures 20 and the fiber channels 28, 30 are secured to the first panel 16, but the second panel 34, the cover panel 42 and the support bars 44 are not yet in place. The two optical fiber bundles exiting the optical switching module 48 are then laid each in a respective one of the fiber channels 28, 30, depending upon from which side of the module 48 they exit. Individual fibers are then guided between adjacent pairs of standoffs 32 and terminated at desired connection points within the fiber connector blocks 22. After all of the optical fibers are appropriately terminated, the second panel 34 is secured to the fiber channels 28, 30. Excess fiber is then gently pulled from the fiber channels through the spaces between adjacent ones of the tabs 36, gathered into small bundles, and gently wrapped around the saddles 40. The cover panel 42 and the support bars 44 are then installed and the first panel 16 is pivoted back to a vertical orientation.

It should be noted that each individual fiber can be terminated anywhere in the field of fiber connector blocks 22, no matter whether it is an input fiber to the optical switching module 48 or an output fiber from the optical switching module 48. This eases the field installation.

Accordingly, there has been disclosed an improved optical fiber distribution panel assembly. While an illustrative embodiment of the present invention has been disclosed herein, it will be appreciated that various adaptations and modifications to the disclosed embodiment are possible and it is therefore intended that this invention be limited only by the scope of the appended claims.

What is claimed is:

1. An optical fiber distribution panel assembly comprising:

a base member;

a first panel hingedly secured to said base member about a horizontal axis, said first panel having a pair of lateral edges extending upwardly from the horizontal axis and said first panel being formed with a plurality of apertures each adapted to receive a respective fiber connector block;

a pair of fiber channels each mounted to a respective one of the lateral edges of said first panel;

a second panel secured to said pair of fiber channels; and a plurality of fiber takeup saddles mounted to said second panel.

2. The assembly according to claim 1 further comprising:

an optical switching module supported on said base member;

wherein optical fibers terminated at said module extend within said fiber channels between said module and said fiber takeup saddles.

3. The assembly according to claim 1 further comprising:

a cover panel overlying said second panel and said plurality of fiber takeup saddles, said cover panel being secured to the fiber channels.

4. The assembly according to claim 3 further comprising:

a plurality of vertically spaced horizontal support bars overlying said cover panel and secured to the fiber channels.

5. The assembly according to claim 1 further comprising:

a plurality of vertically spaced fiber guide members secured to each of said pair of fiber channels inward of the respective lateral edge.

6. Th e assembly according to claim 1 wherein each of said pair of fiber channels comprises an elongated sheet metal member formed into a longitudinally open substantially cylindrical shape.

7. The assembly according to claim 1 wherein said second panel includes a plurality of vertically spaced laterally extending tabs which are secured each to a respective one of said pair of fiber channels;

whereby a space between adjacent tabs provides an opening for the passage of an optical fiber between a takeup saddle and a connector block received in a first panel aperture.

* * * * *